May 2, 1933. H. D. MALLISON ET AL 1,906,699
VEHICLE CONTROL FOR BRAKE AND DOOR APPARATUS
Filed May 28, 1930 5 Sheets-Sheet 5

Inventors
Harry D. Mallison.
Edward G. Parvin.
By their Attorneys. Darby & Darby.

Patented May 2, 1933

1,906,699

UNITED STATES PATENT OFFICE

HARRY D. MALLISON, OF PHILADELPHIA, PENNSYLVANIA, AND EDWARD G. PARVIN, OF ROSELLE, NEW JERSEY, ASSIGNORS TO NATIONAL PNEUMATIC COMPANY, OF NEW YORK, N. Y., A CORPORATION OF WEST VIRGINIA

VEHICLE CONTROL FOR BRAKE AND DOOR APPARATUS

Application filed May 28, 1930. Serial No. 456,447.

This invention relates in general to interconnected brake and door apparatus by means of which the operation of the brakes and doors may be safely controlled.

One of the objects of this invention is the provision of brake apparatus on all types of vehicles, and particularly as disclosed on buses which is interconnected with the door operating apparatus so that the doors cannot be opened unless the brakes are applied and the brakes cannot be released unless the doors are closed.

A further object of this invention is the provision of apparatus which will accomplish these purposes which requires only simple conscious acts on the part of the operator to effect its correct operation.

A further object of this invention is the provision in apparatus of this nature of means whereby the doors cannot be closed if a passenger is alighting, even though the operator attempts to close them.

A still further object of this invention is the provision of mechanism which prevents the release of the brakes even though the operator attempts to release them if the doors are not closed.

A still further obect of this invention is the provision of automatic apparatus by means of which the power plant control—the accelerator in the case of a bus—is locked against operation while the doors are open.

Another object of this invention is the provision of a signal light for the operator of the bus by means of which he may know when the doors are closed and the provision of a stop light for the vehicle.

Another object is to provide means controllable from the exterior of the bus by means of which the doors can be opened and closed when desired.

A still further object is to provide both passenger and operator controlling means which must coact before the doors may be opened after the brakes are applied and arranged so that the passenger device effects no control until the operator's device is actuated.

An additional object involves an arrangement of the apparatus so that the doors cannot be closed or the brakes released while a passenger control device is actuated.

Another object of this invention involves an arrangement of the apparatus so that the control of the doors and brakes is immediately placed back in the hands of the operator when the passenger control device is released.

These and other objects, as will appear from the following disclosure, are secured by means of the device as disclosed.

This invention resides substantially in the combination, construction, arrangement, and relative location of parts, all as will be described in the following specification.

Referring to the drawings—

Fig. 4 is a vertical cross-sectional view through the pressure control valve in the system;

In order to insure the safe operation of power driven vehicles, of which the modern bus is an example, it is desirable to interconnect the brake and door operating apparatus so that the doors cannot be opened until the brakes are applied, the brakes cannot be released until the doors are closed, and the doors cannot be closed until the passageways are clear. In addition, it is highly desirable, as a practical matter, to have the apparatus which will accomplish these operations as simple as possible from the operational viewpoint so that the vehicle operator will not be so overburdened with duties that he cannot attend to the safe operation of the bus. The general purpose of this invention is to provide an apparatus which will have these desirable features.

The invention will best be understood by direct reference to the drawings. The particular vehicle disclosed for purposes of illustration is a bus which has been indicated by the outline 1. Of course the features of this invention may be applied to the many forms of vehicles which are now well known and is not, therefore, restricted to buses. At 2 have been diagrammatically illustrated the four brake cylinders, one for each wheel, and at 3 are the connecting rods which extend to the brake apparatus. A source of fluid under pressure is indicated at 8 and is shown connected to a valve 6 which is controlled by the usual foot pedal or lever and is placed in the bus so as to be accessible to the operator.

Figures 1, 2:
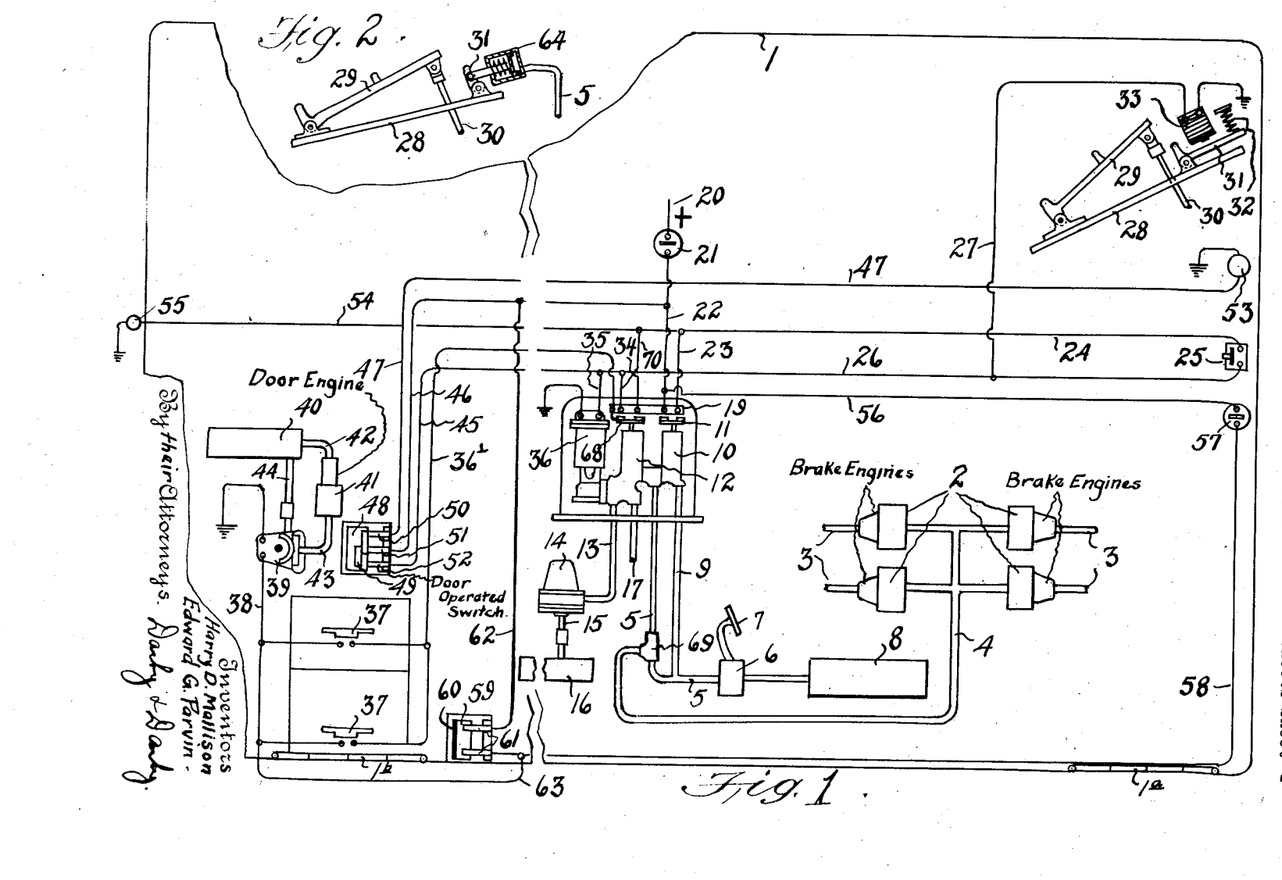
Figure 1 is a diagrammatic illustration of the elements of this invention and the manner in which they are associated and interconnected.
Fig. 2 is a detail view of another form of accelerator lock.

The valve 6 is connected by pipes 5 and 4 to the four brake cylinders as illustrated. Pipe 5 also runs to and connects with the interlock unit which will be described in detail below. Pipe 5 is also connected through pipe 9 to the cylinder of the pneumatic switch 10. The switch arm is indicated generally at 11 and when operated acts to bridge two contacts mounted on the support 19. 12 represents generally a second pneumatic switch which is connected through the electro-magnetically controlled valve 36 to pipe 13. The pneumatic switch 12 operates switch arm 68 to bridge two other contacts mounted on the support 19. At 14 is shown generally a pressure control valve by means of which predetermined constant pressure is supplied to pipe 13 from the fluid under pressure in the source 16 through pipe 15. Pipe 17 connects the various pieces of apparatus to the atmosphere. These various connections will be apparent from the detailed figure which will be described later of the interlock unit and the pressure control valve. Connected in pipe 5 is a double check valve 69 of the usual and well known construction through which pipe 4 is connected to pipe 5. At 20 is indicated a wire which is connected to the positive side of any suitable current source at one end and at the other end to one terminal of the switch 21. The other terminal of this switch is connected by wire 22 to the left hand contact on the support 19 controlled by pneumatic switch 10. The other contact of this switch is connected by wire 23 to wire 24 which extends to the push button switch 25 arranged to be accessible to the operator. The other side of this switch is connected through wires 26 and 34 to one of the contacts of pneumatic switch 12. The other contact of this switch is connected by wire 70 to wire 54 which in turn is connected to wire 24. Wire 54 extends to the stop light 55 on the rear of the vehicle which is grounded. Wire 27 connects the electro-magnetic winding 33 with wire 26. The other terminal of the magnet is grounded. 29 represents the accelerator lever which is connected by rod 30 to the carburetor control. Lever 29 is pivotally supported on the floor 28 of the vehicle. A right angle lever 31 is pivotally mounted on the floor and is arranged so that when it is rotated in a counter-clockwise direction upon energization of the magnet 33 it will project into the path of the accelerator lever 29 so that it may not be pushed downwardly. A spring 32 normally holds the lever 31 out of the path of movement of lever 29 and rod 30. The electro-magnetically controlled valve 36 is of a very well known construction and has the usual solenoid winding, one terminal of which is grounded as indicated and, in this case, the other terminal of which is connected through wire 35 to wire 45 which is an extension of wire 26. The switch arm of pneumatic switch 12 is connected by wire 36' to one terminal of each treadle control switch 37. The vehicle is provided with a front and rear door on the right hand side thereof, which have been indicated by the reference numerals 1a and 1b. The door 1a is at the forward end of the bus adjacent the operator's station and may be opened by him either manually or with manually controlled power operated devices. The rear door, which is not readily under his observation, is provided in a well known manner with treadle plates in the passageway, which treadles operate, in the usual and well known manner, control switches. In the diagrammatic illustration of Fig. 1 the treadle and the switch have been indicated at 37. The other two contacts of the treadle switches are connected to wire 38 which terminates at one terminal of the solenoid winding of the electro-magnetically operated valve 39, the other terminal of which is grounded. This valve 39 is of the exhaust type and valve 36 is of the pressure type. At 40 is shown another source of fluid under pressure which is connected by pipe 42 to the small cylinder of the standard differential fluid pressure operated engine 41. A wire 46 extends from wire 22 to contact finger 51 of the door operated switch. Wire 45 extends to spring finger 52 and wire 47 connects spring finger 50 with the operator's signal lamp 53 which is grounded. The door operated switch is shown in detail in Fig. 6 and represents a very well known type of switch which is very extensively used on vehicles having power operated doors. The switch, as shown in Fig. 1, is in the position which it assumes when the door is closed, so that contact 49 bridges spring fingers 50 and 51. When the door opens its movement operates the drum 48 of the switch so that the connection between spring fingers 50 and 51 is broken and a connection between spring fingers 51 and 52 is established. Wire 22 is also connected through wire 56 to a switch 57 adjacent the operator's position. The other terminal of this switch is connected to one of the spring fingers 61 of a switch operable from the exterior of the bus. Wire 58 is also connected to wire 38 through wire 63. The other spring finger 61 of the switch is connected through wire 62 to wire 46. In the position of the drum 59 of this switch as it is shown spring fingers 61 are disconnected. This is the normal position of the switch. When properly authorized persons desire to enter the bus, it being at rest, drum 59 is rotated so that its contact 60 approaches spring fingers 61 to establish circuits to be described later.

In Fig. 2 is illustrated a pneumatically operated lock for the accelerator pedal. In this case the locking lever 31 is pivotally connected to a small piston in the cylinder 64. A pipe 5 extends from this cylinder to pipe 5 of Fig. 1 so that it is operated as will be described later. As shown then in Figs. 1 and 2 either an electrically operated lock or a pneumatically operated lock for the accelerator lever may be employed with the system of this apparatus.

It may be well to point out here that although three separate fluid sources 8, 16 and 40 have been shown they might easily be combined into one fluid source.

Figure 3:
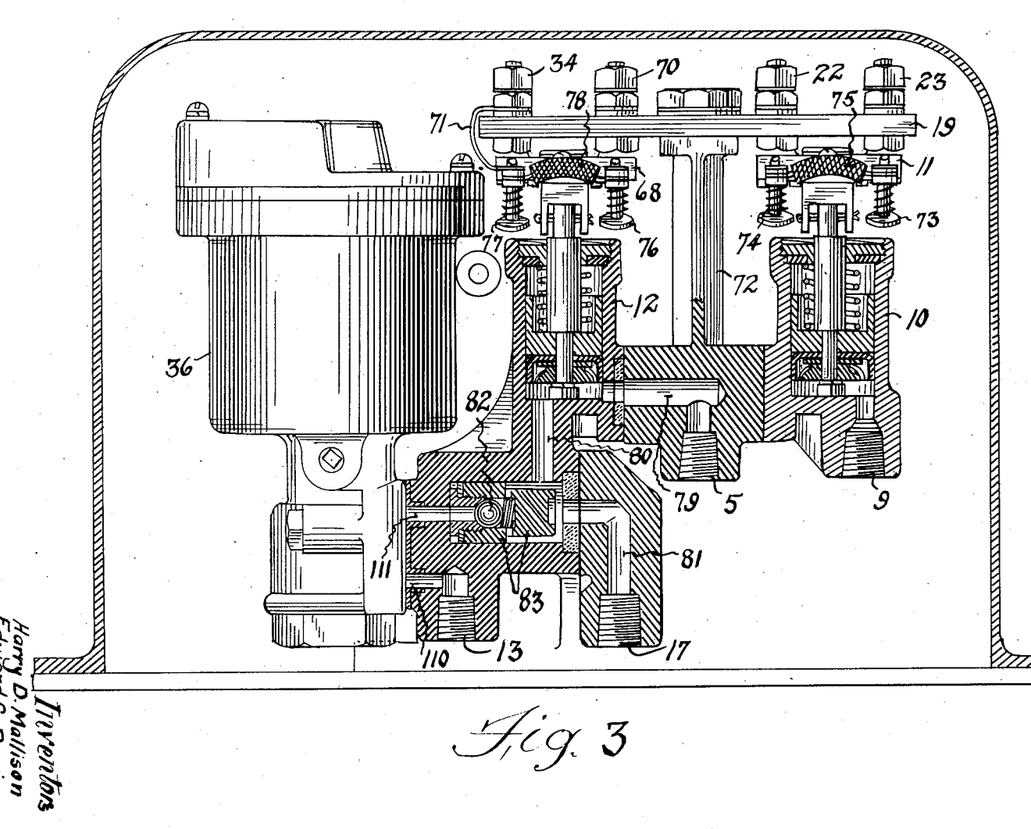
Fig. 3 is an elevational view with some parts in vertical cross-section of the various pneumatically controlled switches and the electro-magnetic valve cooperating therewith.

The interlock unit is shown clearly in detail in Fig. 3. It is pointed out here that for purposes of simplicity, clearness and ease in reading the drawings the ports which receive the various pipes have been given the same number as has been applied to the pipes so that the connections will be easily understood. The pneumatic switch 10 is shown comprising a simple cylinder and piston operating therein, which piston is connected to the movable switch arm 11. The switch arm 11 has mounted thereon the two contacts 73 and 74 which are electrically united by the jumper 75. Attached to the standard 72 is the insulating support 19 on which are mounted contacts which have been given the same reference numeral as the wires to which they are connected.

Thus, when switch arm 11 moves upwardly the contacts 22 and 23 are connected together electrically. Pipe 9 connects into port 9. Pipe 5 connects into port 5, which port is in communication with the passage 79. At 12 is the other pneumatic switch comprising a simple cylinder and piston which is likewise pivotally connected to the switch arm 68 supporting the contacts 76 and 77 which are electrically united by the jumper 78. Contacts 34 and 70, which receive wires of the corresponding number, are mounted on the support 19. Contact 34 is electrically united by wire 71 with contact 77. Port 13 receives pipe 13 and port 17 receives pipe 17 which is in communication with the passage 81. The magnet valve 36 is arranged to interconnect passages 110 and 111 when operated. Plunger 83, when it moves to the right, closes off passage 81 and when it moves to the left it opens communication between passages 81 and 80. Passage 80 opens into the cylinder of the pneumatic switch 12. Likewise, passage 79 opens into this cylinder. Plunger 83 is provided with a passage through the center of a portion thereof which opens upwardly intermediate its ends and is controlled by the ball check valve 82. The operation of this unit will be described in connection with the other apparatus. The pressure control or constant pressure valve 14 is shown (Fig. 4) comprising the body 85 having the threaded recess 86 which is closed by means of a plug 87 having a passage therethrough terminating in the port 15 which receives pipe 15. The top casing of the valve is shown at 92 and securely holds between it and the body portion 85 the flexible diaphragm 90.

Mounted on this diaphragm is a plunger 88, as well as the stiffening and supporting disc 89. A spring 91 of the proper strength rests on the flexible unit and abuts at its other end against the suitably shaped end of the screw 93 which extends through casing 92. Screw 93 may be adjustable up and down to vary the pressure of the spring on the flexible diaphragm. The flexible diaphragm is limited in its downward movement by suitable stops as shown. The plunger 88 is provided with a valve edge 95 arranged to cooperate with and seat on the valve seat 94. This valve is of a usual and well known construction and acts to receive fluid under pressure from a source and to deliver it at a constant predetermined pressure. The fluid entering port 15 passes up around the plunger 88 to the space under the flexible diaphragm 90 and then out through the passage connected to port 13. As the pressure varies the plunger 88 moves up and down varying the area of the opening through which the fluid moves to effect the well known throttling action resulting in the control of the pressure delivered to the outlet.

Figure 5:
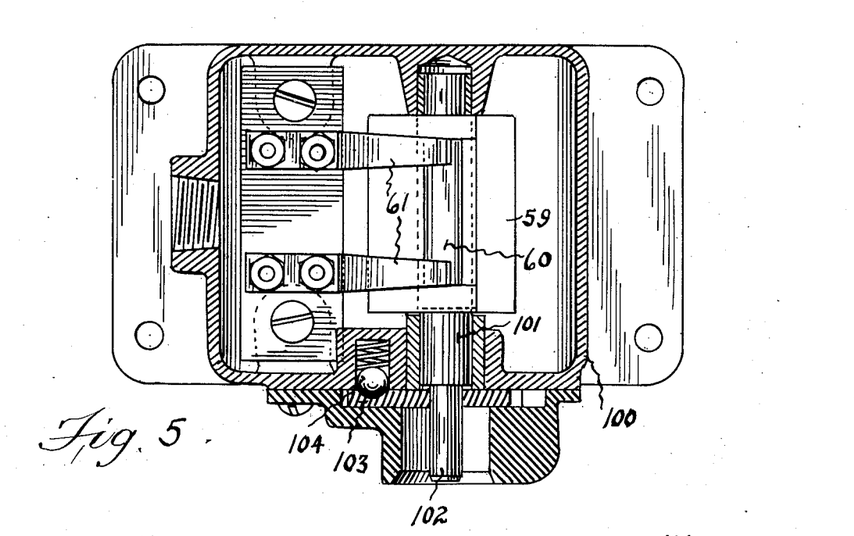
Fig. 5 is a central horizontal cross-sectional view of the switch by means of which the doors may be opened from the exterior of the vehicle.

At Fig. 5 is disclosed the switch by means of which the doors may be operated from the exterior of the bus. This switch is sometimes called the fare-taker's switch. It is shown comprising a casing 100 within which is journaled the transverse shaft 101. Supported on this shaft is the insulating drum 59 on which is mounted a contact plate 60. The spring fingers 61 are mounted on a suitable insulating support and in one position of the drum (the one shown in the figure) the spring fingers 61 are bridged by contact 60. In the other position of this switch contact 60 moves out from under spring fingers.

Secured to shaft 101 is a disc 103 which has two indentations on its surface. A small ball bearing 104 is urged against the disc 103 by a spring. In one position of the switch the ball engages one indentation and in the other position of the switch it engages the other indentation. This serves to give a positive action to the switch and serves to hold the switch in the two extremes of its movement. Shaft 101 extends beyond a casing 100 and terminates in a suitably shaped portion 102 adapted to receive a similarly shaped key so that it may not be operated by unauthorized persons.

Figure 6:
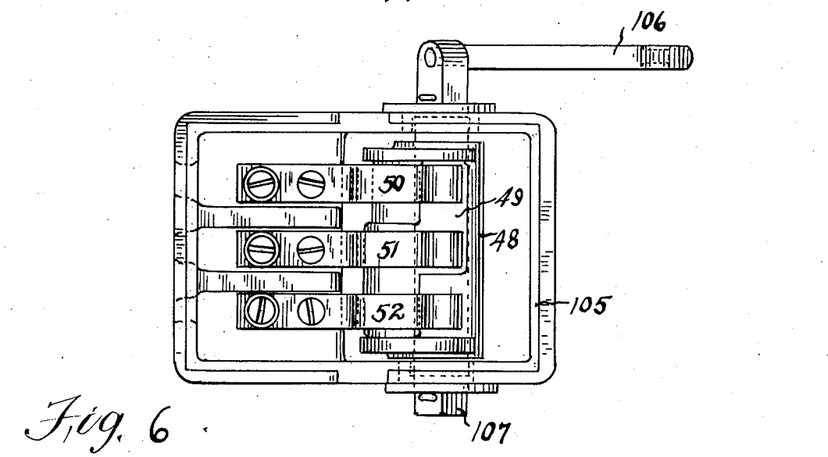
Fig. 6 is a top plan view with the cover removed of the door operated switch employed in this invention.

The door operated switch has been illustrated in Fig. 6. This switch comprises a casing 105 with a transverse shaft 107 journaled therein. The lever 106 connects this shaft with the door or its operating equipment so that the switch is moved with and by the door. Mounted on the shaft is an insulating drum 48 which supports the contact 49. Within the casing are the three spring fingers 50, 51 and 52 which are insulated from each other. When the door is closed the switch is in the position shown in Fig. 6, at which time contact 49 bridges fingers 50 and 51. In its other position when the door is open contact 49 bridges spring fingers 51 and 52, while spring finger 50 is out of contact with plate 49.

Figure 7:
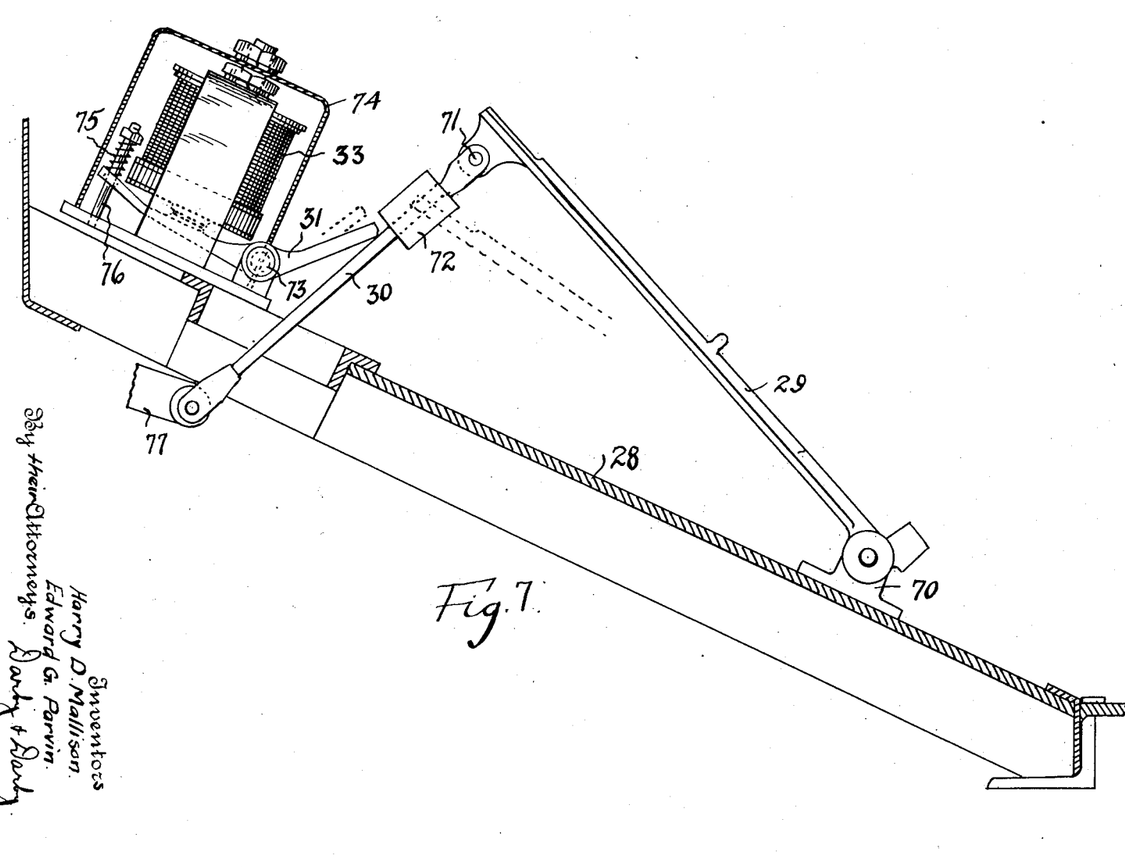
Fig. 7 is an enlarged detail view of the electro-magnetic type of accelerator lock.

The electric form of accelerator lock has been shown in more detail in Fig. 7. The floor boards of the vehicle are indicated at 28. Secured thereto is the pivotal support 70 on which the accelerator lever is mounted. This lever is pivotally connected at 71 to the rod 30 which, in turn, is pivotally connected to a lever 77 which operates or controls the carburetor. Within the casing 74 is the electro-magnet 33. Pivotally supported on the casing at 73 is the lever 31 which, in the position shown, projects into the path of the stop 72 attached to the rod 30. The lever 31 is in the position which it takes when the electro-magnet 33 is energized. When it is deenergized the spring 75 on the stud 76 forces the lever 31 into counter-clockwise direction to the dotted position so that it is out of the path of stop 72.

In the operation of the apparatus when assembled as disclosed (Fig. 1) the vehicle is brought to a stop by applying pressure on the foot pedal 7. This operates valves 6 to permit the fluid to flow from the source 8 into pipes 5 and 9. The check valves 69 permits the fluid to flow into pipe 4 and to each of the brake cylinders 2 so that the brakes are applied. The fluid flowing through pipe 9 enters port 9 (Fig. 3) and forces the piston of pneumatic switch 10 upwardly causing wires 22 and 23 to be interconnected.

Current may then flow from wire 20 through switch 21, which is normally closed, through wire 22, and through the switch 10 to wire 23, and finally through wire 24 up to switch 25. Current also flows from wire 24 through wire 54 and lamp 55 to ground. This current source connected to wire 20, it is to be remembered, is also grounded. Thus the stop lamp is lighted. When the bus has come to a stop the operator of the bus momentarily closes switch 25. Current then flows through wire 26. From wire 26 it passes through wire 27 to the magnet winding 33 to ground energizing that magnet and moving lever 31 so as to prevent the movement of accelerator pedal 29. Current also flows from wire 26 through wire 35 and the solenoid winding of the magnet valve 36, to ground. The magnet valve is energized, effecting interconnection between ports 110 and 111, Fig. 3. Fluid under pressure then flows from source 16 through pipe 15, through valve 14, where it experiences a predetermined drop in pressure and then continues through pipe 13 to passage 110, Fig. 3, through the magnet valve into passage 111. This moves the plunger 83 to the right causing it to close off passage 81, which passage connects through port 17 to pipe 17 which is the exhaust pipe that opens the apparatus to atmosphere. When plunger 83 is seated the ball 82 of the check valve moves to the right against the action of the spring acting thereon, establishing communication between passages 111 and 80. Fluid pressure is thus supplied to the cylinder of the pneumatic switch 12 causing its piston to move upwardly effecting a bridging of the contacts 34 and 70 and closing the circuit, including wires 34 and 70 connected thereto.

The fluid pressure from source 16 also passes through passage 79 and port 5 into pipe 5 but under the conditions so far described it does not get past the check valve 69 since the pressure delivered from valve 14 is lower than the pressure in source 8. The closing of pneumatic switch 12 first establishes a circuit from wire 24 through wire 70, through the pneumatic switch to wire 34 and thence through wires 26 and 35 of the winding of magnet valve 36 which is grounded. Thus a holding circuit for the solenoid of the magnet valve 36 is established so that current flows therethrough even though switch 25 is open, the current now being supplied from wire 24 rather than wire 26. Wire 36' is also connected to wire 24 through wire 70 and pneumatic switch 12. As a result current is supplied up to the treadle operated switch 37. If a passenger is standing on either treadle which controls the switches 37 they are closed and as a result the current continues on through wire 38, through the solenoid winding of magnet valve 39 and thence to ground. As a result the magnet valve is operated and fluid pressure which has been supplied through pipe 44, through the valve and through pipe 43 to the large cylinder of the engine 41 is exhausted to the atmosphere. As is well known in the art differential engines when the doors are closed are supplied with fluid pressure in both cylinders from the same source so that the pressure exerted by the larger piston overcomes the pressure of the smaller piston and the door is closed. When fluid pressure is exhausted from the larger cylinder the piston of the smaller cylinder moves the door to open position. It is to be understood, of course, that fluid pressure is constantly supplied to the smaller cylinder through pipe 42. As the door opens it moves drum 48 to its other position so that the circuit connected to spring fingers 50 and 51 is broken and as a result lamp 53 is extinguished. The circuit connecting the spring fingers 51 and 52 is completed, as before stated, so that a holding circuit is provided for the solenoid winding 36. As long as either treadle switch 37 is closed, which means that a passenger is standing on the treadle, the doors remain open and the operator cannot close them nor can he release the brakes.

Should he attempt to release the brakes by removing the pressure on pedal 7 so that valve 6 cuts off the supply of energy from the source 8, energy will be supplied to the brake engines 2 in the following manner. Fluid under pressure will flow from the cylinder of pneumatic switch 12 through passage 79 to and through pipe 5 opening the check valve 69 and supplying fluid pressure through pipe 4 to the engines to maintain the brakes applied. The pressure having been cut off from the source 8 the pressure from source 16 will cause check valve 69 to open and maintain the brakes. It will be seen, therefore, that until the passageways to the door are clear the brakes may not be released by the operator nor the doors closed.

As soon as the treadles are free magnet valve 39 is deenergized and fluid pressure is supplied to the large cylinder of the door engine to permit the doors to close. As they close they return drum 48 of the door operated switch to the position shown in the drawings breaking the holding circuit to the electro-magnet valve 36 and establishing the circuit to the signal light 53 indicating to the operator that the doors are closed. The deenergization of the magnet valve 36 cuts off the supply of fluid under pressure to the pneumatic switch 12 and it may then open. The fluid trapped in the cylinder 12 moves plunger 83 to the left, Fig. 3, and opens the cylinder to exhaust through pipe 17. Pipe 5 is also open to exhaust. Pedal 7 is now released cutting off the supply of fluid to the brake engines so that the brakes are released. If pedal 7 has been previously released the supply of pressure to the brakes will have been cut off by the deenergization of magnet valve 36 and the opening of pipe 5 to exhaust through pipe 17. At the same time when magnet valve 36 is deenergized the supply of current to the lock magnet 33 is cut off and the accelerator lever 29 is freed for operation. The vehicle may now proceed on its way.

If for any reason the operator desires to open the doors when no passenger is standing on the treadles he may do so by closing switch 57. Current then flows from wire 22 through wire 56, switch 57, wire 58, wire 63, wire 38, and through the magnet valve 39 to ground. The energization of this valve operates, as before, to permit the doors to open.

Likewise, if an authorized person wishes to open the doors of the bus from the exterior thereof he applies a suitably shaped key in his possession to the end 102 of shaft 101 of the fare-taker's switch shown in Fig. 5. The drum 59 of the switch is turned by the key so that contact 60 bridges fingers 61. Current then flows from wire 22 to wire 62 through the switch to wire 63, through wire 38 to magnet valve 39, and thence to ground. When the switch is open the circuit to the magnet valve 39 is broken and the doors may close.

It may be well to point out here that in one form of construction contemplated the upper treadle plate and its switch will be placed in the floor of the vehicle directly in front of the doors while the lower treadle switch will be placed on the step of the vehicle.

The pneumatic accelerator lever lock shown in Fig. 2 when used simply has its cylinder 64 connected to pipe 5 between the check valve 69 and the brake interlock magent valve 36. Thus when the operator applies his brakes for ordinary braking operations without energizing magnet valve 36, the accelerator lever is not locked. When switch 25 is closed, pressure will flow through pipe 5 moving the piston in cylinder 64 over so that the latch 31 is in the path of movement of the accelerator lever so that it cannot be operated.

From the above description it will be apparent that we have devised an interconnected door and brake control system employing certain principles of construction and operation, which principles may be embodied in other physical forms without departing from the spirit of this invention. Broadly, we conceived the invention to involve apparatus for operating the brakes and doors of vehicles so arranged that the doors cannot be opened until the brakes are applied and after the doors are opened the brakes cannot be released and the doors cannot be closed until the passengers adjacent the doors have moved out of the doorways leaving the doorways clear and the vehicle cannot be accelerated while the doors are open. We do not, therefore, desire to be strictly limited to the structure disclosed for purposes of illustration but rather to the scope of the invention as it is defined in the appended claims.

What we seek to secure by United States Letters Patent is:

1. In a door and brake operating system for vehicles, the combination comprising door engines, brake engines, an energy source for said engines, connections between said source and said engine, means in said connections for controlling the supply of energy therethrough, electro-pneumatic means controlled by an operator for completing the connection between the brake engines and the source and preparing said control means for further operation, passenger electro-pneumatic control means for finally operating the door engines, and an operator electro-pneumatic control means for placing the passenger control means in control of the door engines.

2. A control system as described comprising brake engines, control means for supplying energy to the brake engines to operate them to braking position, a propulsion engine control device, electro-magnetic means for locking said control device in off position when energized, a circuit for said electro-magnetic means, a power operated switch in said circuit simultaneously energized when the brake engines are energized to close the switch to partially complete said circuit, and a manual switch for completing said circuit to energize the electro-magnetic means to lock said control device in off position.

In testimony whereof we have hereunto set our hands on this 30th day of April, 1930.

HARRY D. MALLISON
   EDWARD G. PARVIN.